G. H. Clark,
Mower.

No. 114,408.   Patented May 2, 1871.

Witness
Geo. H. Tibbitts
J. W. Mountcastle

Inventor
George H. Clark

UNITED STATES PATENT OFFICE.

GEORGE HOMER CLARK, OF CLEVELAND, OHIO, ASSIGNOR TO HIMSELF AND PETER B. REID, OF LOCKPORT, NEW YORK.

IMPROVEMENT IN REAPING-MACHINES.

Specification forming part of Letters Patent No. 114,408, dated May 2, 1871.

I, GEORGE HOMER CLARK, of Cleveland, in the county of Cuyahoga and State of Ohio, have invented a new and Improved Reaping-Machine, of which the following is a specification:

This invention relates to that class of reaping-machines which is designed for cutting grain only; and consists in a peculiarly new construction, combination, and arrangement of devices, widely differing from any other plan heretofore used. It is adapted to cut double the breadth with the same power of other reapers, it being constructed and arranged to cut both sides of the driving-wheel, and, owing to its breadth, is not adapted to cutting grass as a mower, being confined to comparatively smooth ground, or, rather, to cutting such a distance from the surface of the ground as to make it especially a reaping-machine for cutting grain very rapidly and in broad rows, the machine being propelled before the team and cutting the grain before it.

Figure 1:
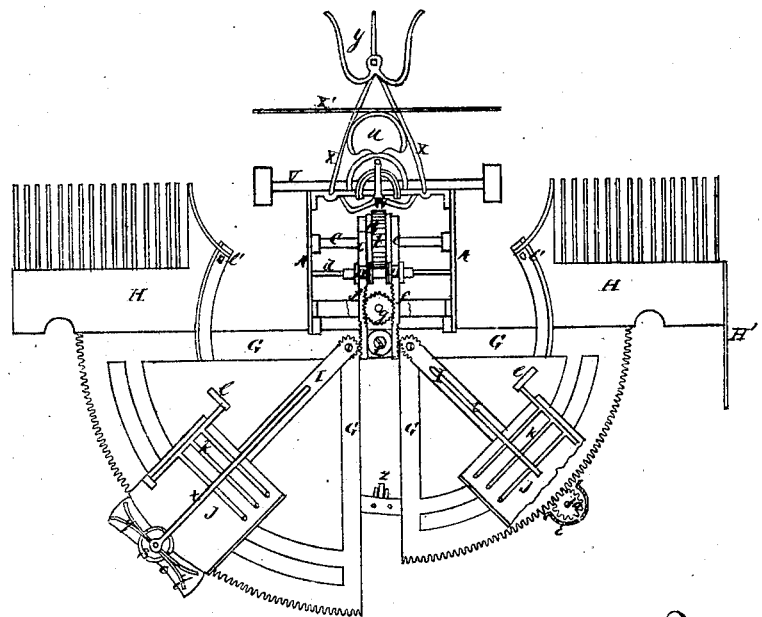
Figure 2:
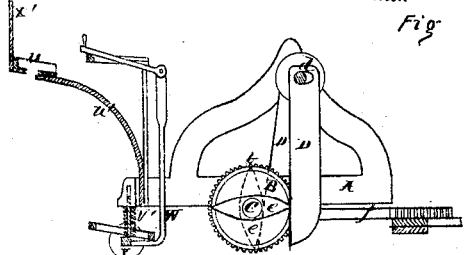
Figure 3:
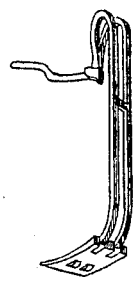
Figure 4:
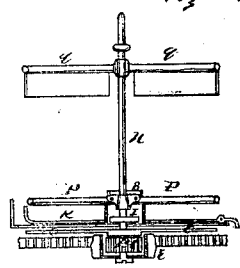
Figure 5:
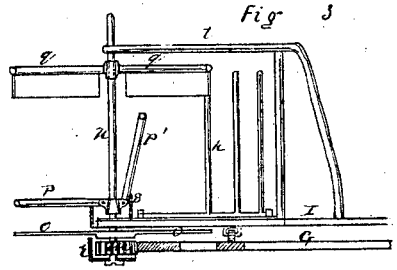

In the drawing, Figure 1 is a plan view of my reaping-machine. Fig. 2 is a detached sectional view of the main frame, showing the driving-wheel in its connection with swinging bars and rack-bars for actuating the cutting devices, also showing the driver's seat and the mode of guiding the machine. Fig. 3 is a detached view of a shoe having rollers under it for dropping under the driving-wheel, upon which it rides when it is desired to stop the motion of the driving-wheel. Fig. 4 is a front elevation of one of the cutting devices, showing mode of dropping the grain onto the table and the method of discharging the grain from the table. Fig. 5 is a view of the same in a transverse position.

A represents a frame, upon which is arranged the mechanism for operating the machine, and which supports the seat for the driver and operator. B is a driving-wheel, placed on a shaft, C, having its bearings in the sides of the frame A, the face of the wheel B being broad and having teeth $b$ for insuring its taking hold of the ground.

In the upright sides of the frame A are suspended two swinging bars, D D, to a cross-bar, $d$, hanging in front of two cams, $e\ e$, projecting on each side of the wheel B, and by which the arms D D are actuated. The cams $e\ e$ are placed transversely across the wheel B, so as to act alternately on the arms.

Placed in front of the arms D D, in guides in the front of the frame A, are two racks, $f\ f$, having teeth one half their length on their inner sides, and the other half on their opposite or outer sides, and placed between them is a pinion-wheel, $g$, engaging with the two racks.

To the front of the frame A are secured two pilot-frames, G G, in the form of quarter-circles, the edges of them having teeth. To the sides of the pilots are attached platforms H H.

Playing over the pilots G G are levers I I, to which are attached the cutting devices represented in Figs. 4 and 5.

The levers I I are pivoted at the center of the quadrant pilot-frames, and have their ends round, and have teeth cut on them, which engage with the teeth on the outside of the bars $f\ f$, and by which they are actuated.

There is placed a small wheel, $i$, between the bars $f\ f$, for the purpose of keeping them in close contact with the segments of the levers I I. It also serves to guide the bars $f\ f$ in their forward and backward movement.

On the outer ends of the levers I I is fixed a table, J, provided with clearers $k$, arranged to be thrown up when the table arrives at the platforms H H in each alternate sweep by the arms $l$ striking against a projection, $l'$, on the platform H.

On the outer ends of the levers I I are pivoted pinion-wheels $m\ m$, which engage with and are actuated by the teeth on the pilots G G. Said pinions are considerably thicker than the pilot-frames, so that in case of any up or down movement they will not be thrown out of gear.

Attached to the pinions $m\ m$ are upright shafts $n\ n$, to which are secured cutters $o\ o$ and dropper-arms $p\ p$ and $q\ q$, which revolve with the shaft.

The cutters $o\ o$ consist of blades attached at the middle to the shaft just above the pinion, and playing just under the table G. Both sides of the blades have cutting-edges, and revolving rapidly cut the grain in broad sweeps, the revolving arms $p$ and $q$ bearing the grain over and throwing it down upon the tables J.

The upper arms, $q$, are adjustable on the shafts $n$, being secured by a set-screw, by which means they may be raised or lowered to readily adapt them to the various heights of the standing grain.

The pinions $m$ are guarded by a shield, $r$, which prevents the grain or stubble interfering with or clogging the gearing.

A thimble, $s$, is attached to the table J, which surrounds the shaft $n$, and upon the upper edge of which the dropper-arms $p\,p$ ride, the side of the thimble toward the table having its edge raised, so that when the arms $p\,p$ are carried over it they will be raised up out of the way of the clearers $k$, when the clearers are to be thrown up. The top of the shaft $n$ turns in the frame $t$, which is secured to the lever I.

It will here be observed that the cutting devices and the table on which the grain falls are attached to the levers I I, and are carried with them in their swinging movements, the whole deriving their motion from the driving-wheel B.

On the left side of the machine, and attached to the platform, is a leader or guard, H′, for holding the grain up toward the cutters. As that is the side away from the body of the grain it requires something to support it, or it would be pushed over so as not to be cut, which would leave a narrow row of grain standing uncut.

The driver's seat $u$ is attached to a bent spring, $u'$, which is attached to the rear side of the frame A, and is made adjustable, so as to adapt the weight of the rider to balance the machine.

The pilots should be kept buoyant and not allowed to drop onto the ground, and in order to keep them steady a wheel, $z$, is placed under them near the front.

Underneath the rear part of the frame A is an axle, V, attached to it by a linch-pin, V′, on which it turns, said pin having a spring around it to allow easy motion to the machine in going over uneven ground.

To the axle V is attached a guiding-lever, W, which passes up in front of the operator, by which he may guide the machine as it advances and to turn the machine around.

To the rear side of the frame A are attached two pushing-levers, $x\,x$, which reach up back of the driver's seat, where they are united, and where a pair of single or double thills, $y$, are pivoted, the horses for propelling the machine being harnessed between them and pushing the machine before them. The thills being pivoted before the horses allow the machine to be readily guided by the operator with the guiding-lever W, the horses readily following the machine.

When the machine is first set in motion for cutting grain, when it has arrived at the field, the right-hand lever I with its cutting device should be directly in front, at which time the left-hand one would be around to the left side.

It will now be observed that the left-side quadrant is about one length of the cutters $o$ smaller than the right-hand one. This is to allow the right-hand cutting device to cut a little in advance, so as to keep the grain cut clear of the machine as it advances, the machine being so arranged that for every revolution of the driving-wheel B each of the levers I I will travel back and forth in its sweeping movement four times, this proportion of movement being necessary to keep the grain cut away before the machine as fast as it advances. The grain being deposited at both sides of the machine leaves a clear track for the horses to travel in. The grain being deposited from the tables onto the platforms H H, which are provided with long teeth, the stubble reaching up between them, as they drag over the ground, will rake the grain off in rows.

In front of the horses, and attached to the back of the driver's seat, is a screen, $x'$, placed there for a blind, so that the horses may not become frightened by the working of the machinery, and which may be removed, if desired, whenever they become sufficiently accustomed to it.

Having thus described my invention, I claim—

1. The combination, with the driving-wheel B, of the cams $e\,e$, the swinging bars D D, the rack-bars $f\,f$, pinion $g$, and the levers I I, as described, and for the purpose set forth.

2. The combination, with the levers I I, of the table J, clearers $k$, pinion $m$, shaft $n$, thimble $s$, dropper-arms $p$ and $q$, shield $r$, and pilot-frame G, when arranged and operating in relation to each other substantially as and for the purpose set forth.

GEORGE H. CLARK.

Witnesses:
GEO. W. TIBBITTS,
FRED. H. BIERMANN.